US008863226B1

(12) United States Patent
Bailey, Jr. et al.

(10) Patent No.: US 8,863,226 B1
(45) Date of Patent: Oct. 14, 2014

(54) TWO-PARTY, ROLE-BASED TRANSACTION VERIFICATION

(75) Inventors: Donald L. Bailey, Jr., Penn Laird, VA (US); Justin C. Crites, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 13/075,044

(22) Filed: Mar. 29, 2011

(51) Int. Cl.
*G06F 17/00* (2006.01)

(52) U.S. Cl.
USPC ............................................. 726/1; 713/170

(58) Field of Classification Search
None
See application file for complete search history.

(56) References Cited

U.S. PATENT DOCUMENTS

| | | | | |
|---|---|---|---|---|
| 7,818,573 | B2 * | 10/2010 | Martin et al. | 713/170 |
| 8,176,531 | B2 * | 5/2012 | Katsikas | 726/3 |
| 8,255,683 | B2 * | 8/2012 | Dickinson et al. | 713/153 |
| 2010/0125642 | A1 * | 5/2010 | Smith et al. | 709/206 |
| 2011/0137722 | A1 * | 6/2011 | Mathai et al. | 705/14.41 |
| 2011/0161253 | A1 * | 6/2011 | Ma et al. | 705/500 |
| 2012/0167233 | A1 * | 6/2012 | Gillum | 726/29 |
| 2012/0198566 | A1 * | 8/2012 | Gearhart et al. | 726/28 |

OTHER PUBLICATIONS

John R. Vacca, Managing Information Security, 2010, ISBN:1597495336 9781597495332.*
Mohsen Saffarian, Owner-Based Role-Based Access Control OB-RBAC, 2010 International Conference on Availability, Reliability and Security.*
"Role-based access control", downloaded Mar. 29, 2011 from http://en.wikipedia.org/wiki/Role-based_access_control, 5 pp.
"Amazon Simple Email Service (Amazon SES) (beta)", downloaded Mar. 29, 2011 from http://aws.amazon.com/ses/, 4 pp.

* cited by examiner

*Primary Examiner* — Kambiz Zand
*Assistant Examiner* — Gita Faramarzi
(74) *Attorney, Agent, or Firm* — Thomas Horstemeyer, LLP

(57) ABSTRACT

Two-party, role-based email verification can be used by an administrator to control the sending of emails by an authorized user. Various administrator notification/approval options may be provided. Two-party, role-based verification may also be applied to e-commerce transactions and other transactions where two-party, role-based verification is desirable.

24 Claims, 12 Drawing Sheets

Policy Applies to
- [ ] All Authorized Users
- [ ] Specific Authorized User
- [ ] Class of Authorized Users
- [ ] Class of Emails

FIG. 7

Policy Rules
1. [ ] Do not send unless I approve
2. [ ] Send if I don't disapprove within [▼] days
3. [ ] Send as soon as I am notified
4. [ ] Send in degraded mode until I approve/disapprove

FIG. 8

Administrator Actions
- [ ] I approve
- [ ] I do not approve
- [ ] I defer

FIG. 9

TWO-PARTY, ROLE-BASED TRANSACTION VERIFICATION

BACKGROUND

Online buying and selling of products and services over computer networks, such as the Internet, often referred to as "electronic commerce" or "e-commerce", have continued to proliferate with widespread Internet usage. In order to facilitate the sale of products and services, online sellers of products and services often design marketing campaigns wherein a given campaign message, such as an email, text message and/or instant message, is sent to a given set of recipients.

With the proliferation of email marketing, an industry of Email Service Providers (ESPs) has emerged. An ESP is an entity that provides email marketing or bulk email services. ESPs typically obtain the email messages and recipient lists from senders, and provide a sending engine that allows senders to distribute their messages to the recipients via the ESP. Many individuals at the sender may be authorized users who are authorized to send emails from the sender to the ESP for distribution. Often, an administrator or account owner at the sender is responsible for the overall coordination of email marketing activities, and multiple authorized users may be responsible for sending individual email marketing messages via the ESP. Similar relationships between an administrator or account owner and one or more authorized users may exist in e-commerce and in other transaction processing.

BRIEF DESCRIPTION OF THE DRAWINGS

FIGS. 7-9 illustrate control panels that may be used with various embodiments described herein.

DETAILED DESCRIPTION

Figure 1:
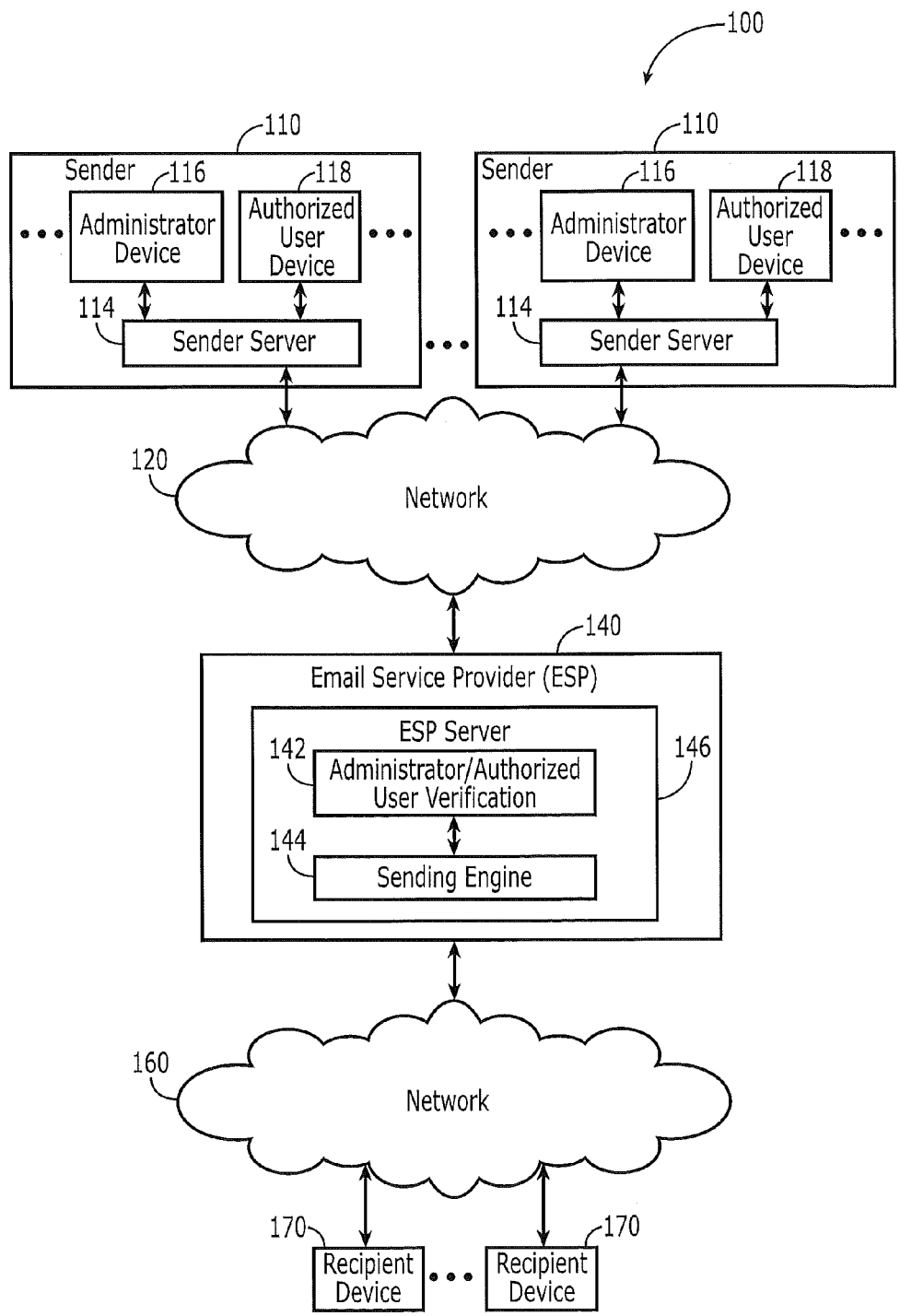
FIGS. 1-3 are block diagrams of systems, devices, methods and computer program products for two-party, role-based transaction verification according to various embodiments described herein.

Various embodiments described herein can provide two-party, role-based email verification that allows an administrator or owner of an account to control and manage the activity of authorized users who may be authorized to access and use the account to send emails. The two-party, role-based verification may also be applied to e-commerce transactions and may also be applied to other transactions where two-party, role-based verification is desirable.

Suppose, for example, that user A employed at "Electronics Warehouse" has administrative control over an email account for sending email messages on behalf of Electronics Warehouse. The email messages may be sent to recipients via a server operated by Electronics Warehouse or via an Email Service Provider (ESP) on behalf of Electronics Warehouse. To help manage the email account, user A has provided a policy that authorizes user B to access and use the account subject to certain policy rules (e.g., to send Electronics Warehouse email campaigns to the ESP). Based on the policy, user A will be notified by the email verification system of user B's activity in the Electronics Warehouse email account. The email verification system may, for example, not allow user B to exceed certain rules set by user A without express approval from user A. Thus, user A can delegate certain authority to user B while monitoring and managing user B's activity.

An administrator may define a policy authorizing what actions and limitations are associated with a particular authorized user. By way of example only, a policy may include requiring approval of the administrator prior to sending of an email message, sending an email message upon failure of the administrator to disapprove within a given period of time, requesting a notification that an email message has been delivered and/or limiting the number of emails that an authorized user may be allowed to request for delivery (e.g., operate in a degraded mode) until the administrator provides approval for a greater amount of emails or until failure of the administrator to disapprove within a given time.

When the administrator has not defined a policy that applies to a particular authorized user, a notification may be sent to the administrator in response to an activity performed by the authorized user. The notification may request approval from the administrator to allow the authorized user to complete the activity. The notification may also request the administrator to set a policy that applies to this particular authorized user.

The policy also may be set by the administrator prior to sending the notification, for example when the user is authorized. The policy may also be modified upon receipt of the notification. Moreover, prior to sending the notification to the administrator, the identity of the authorized user may be verified. The identity may be verified by sending a message to an email address of the authorized user, and confirming that the authorized user replies to the message from the email address of the authorized user.

The sending of the email may take place over two phases. First, sending of the email may commence in a degraded mode in response to receiving the request from the authorized user to send the email to the recipients. Then, the sending of the email to the recipients can continue in a non-degraded mode in response to an action by the administrator. The action may be determined by the policy that is set by the administrator. In one example, the non-degraded mode may send the email to the recipients at a faster rate of sending the email than the degraded mode. Accordingly, the sending of the email may begin at a metered or throttled rate until the action from the administrator takes place, at which time the email can then continue at a non-metered or non-throttled rate.

The operations described above may be performed by a sender to provide two-party, role-based email verification at the sender, or by an ESP to provide two-party, role-based email verification by the ESP for the sender.

The two-party, role-based transaction verification described herein may also be used for e-commerce. For example, an account owner may control the number of transactions, the dollar amount of transactions and/or other parameters of transactions that are initiated by an authorized user. The account owner may define a policy that applies to a particular authorized user. Upon receiving a request from an authorized user to conduct a transaction, an approval request may be provided to the account owner based on the policy that was defined. For example, an approval request may be provided if the dollar amount is greater than that defined in the policy, the number of purchase requests exceeds those defined in the policy and the like. In response to receiving approval from the account owner, the e-commerce transaction may be completed. Moreover, if the terms of the transaction are within the policy set by the account owner, the transaction may be conducted without any action from the account owner.

Various embodiments have been generally described above in connection with email sending and/or transaction processing. Analogous methods or servers of an email sender, of an email service provider, of an e-commerce provider, or of a transaction provider, may be provided. Client devices and methods that interact with the servers also may be provided. Moreover, analogous computer program products that may execute on any of these servers or client devices may also be provided. Accordingly, two-party, role-based verification can be provided in email sending, e-commerce and/or transaction processing environments.

Overall Architectures

FIG. 1 is a block diagram of systems (including devices, such as servers or sender/recipient devices), methods and/or computer program products for two-party, role-based email verification, according to various embodiments described herein. In these systems, devices, methods and/or computer program products 100, an ESP 140 receives email messages and/or a list of potential recipients for the email messages from one or more senders 110, and selectively sends the email messages to the potential recipient devices 170 in response to two-party, role-based verification by the sender.

Referring to FIG. 1, the email messages may originate from one or more senders 110. In FIG. 1, a sender, also referred to as a subscriber, is an entity that subscribes to email delivery services from an ESP 140. The sender generally is a business or other entity that wishes to use an ESP for bulk and transactional email sending services. The sender 110 may include a sender server 114 that can be used to process email transactions for the sender 110 and/or to provide other functionality. FIG. 1 illustrates both an administrator via an administrator device 116 and an authorized user via an authorized user device 118 who are authorized to provide email messages on behalf of the sender 110. In this scenario, the administrator, also referred to as the "account owner", has overall responsibilities for managing the activity between the sender 110 and the ESP 140. The authorized user may, for example, be responsible for supplying one or more email messages or campaigns on behalf of the sender. A sender 110 may have one administrator and one or more authorized users, although multiple administrators may also be provided in other embodiments. The sender server 114, each administrator device 116 and each authorized user device 118 may be embodied by one or more enterprise, application, personal, pervasive and/or embedded computer systems that may be standalone and/or interconnected by a public and/or private, wired and/or wireless, real and/or virtual network including the Internet. For shorthand, an administrator device 116 may also be referred to herein simply as an "administrator" or "account owner" 116 and an authorized user device 118 may also be referred to herein simply as an "authorized user" 118.

An ESP server 146 may be used by the ESP 140 to provide administrator/authorized user verification and to send emails responsive thereto, according to various embodiments described herein. The senders 110 may communicate with the ESP server 146 over a network 120, such as a public and/or private, wired and/or wireless, real and/or virtual network including the Internet. In other embodiments, the administrator device 116 and/or the authorized user device 118 may communicate with the ESP server 146, without communicating through the sender server 114 and/or through the network 120.

Continuing with the description of FIG. 1, the ESP server 146 may include an administrator/authorized user verification system/module 142 and an ESP sending engine 144 that is configured to send the email messages that are received from the senders 110 to recipients 148 at recipient devices 170 in response to the administrator/authorized user verification. The ESP server 146 may communicate with the recipient devices 170 over a network 160, which may be a public and/or private, wired and/or wireless, real and/or virtual network including the Internet, and which may be the same as and/or different from the network 120.

The ESP server 146, the administrator/authorized user verification module 142, the sending engine 144 and the recipient devices 170 may be embodied as one or more enterprise, application, personal, pervasive and/or embedded computer systems that may be standalone and/or interconnected by a public and/or private, real and/or virtual, wired and/or wireless network including the Internet.

Figure 2:
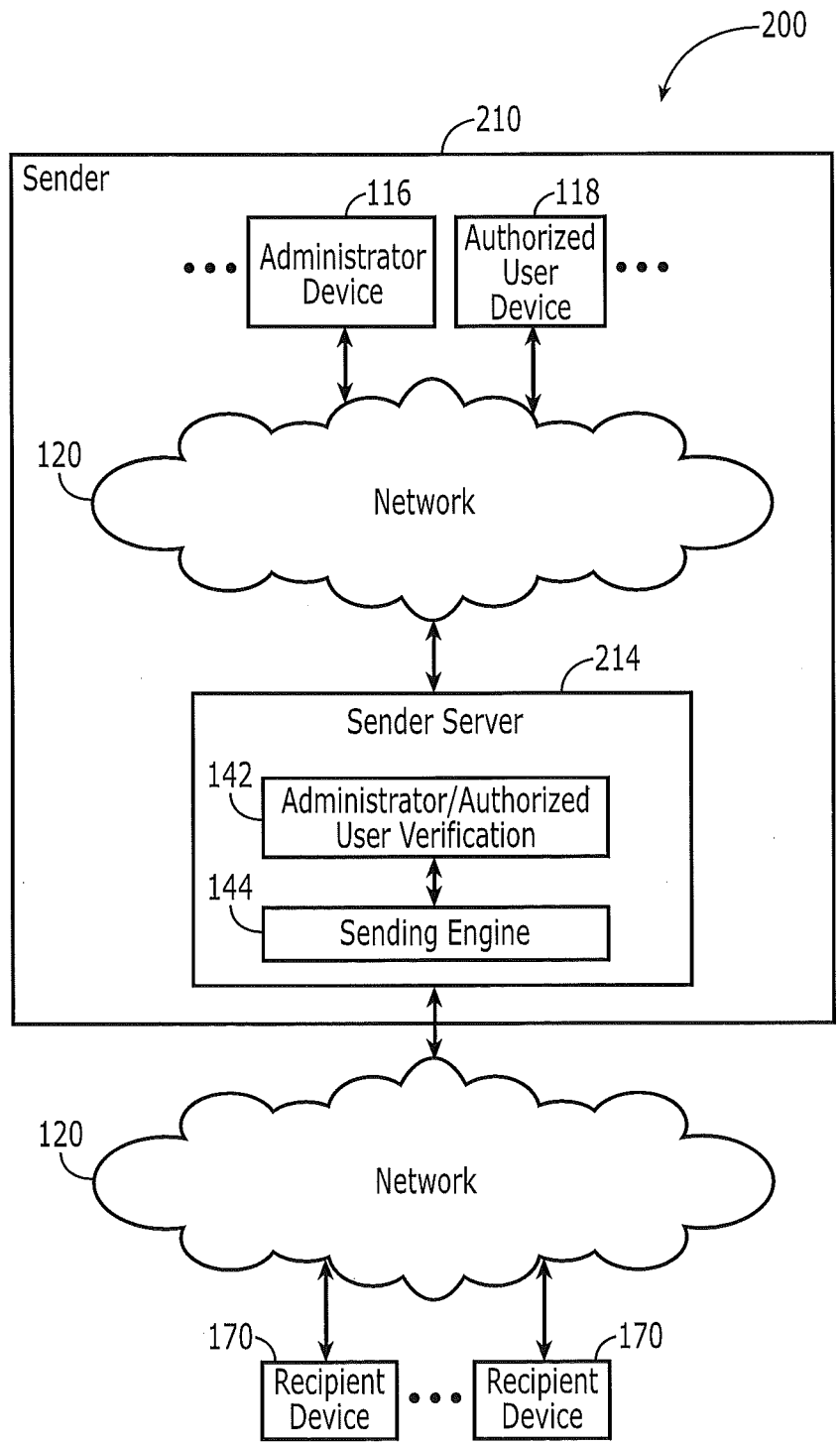

FIG. 2 is a block diagram of systems (including devices, such as server or sender/recipients devices), methods and/or computer program products for two-party, role-based email verification, according to various other embodiments described herein. These systems, devices, methods and computer program products 200 can send email messages in response to two-party, role-based verification, without the need to use a separate ESP as was the case in FIG. 1. Stated differently, in embodiments of FIG. 2, a sender 210 includes the administrator device(s) 116 and the authorized user device(s) 118 and may include a network 120. A sender server 214 includes the administrator/authorized user verification module 142 and the sending engine 144. Thus, a separate ESP need not be used.

Figure 3:
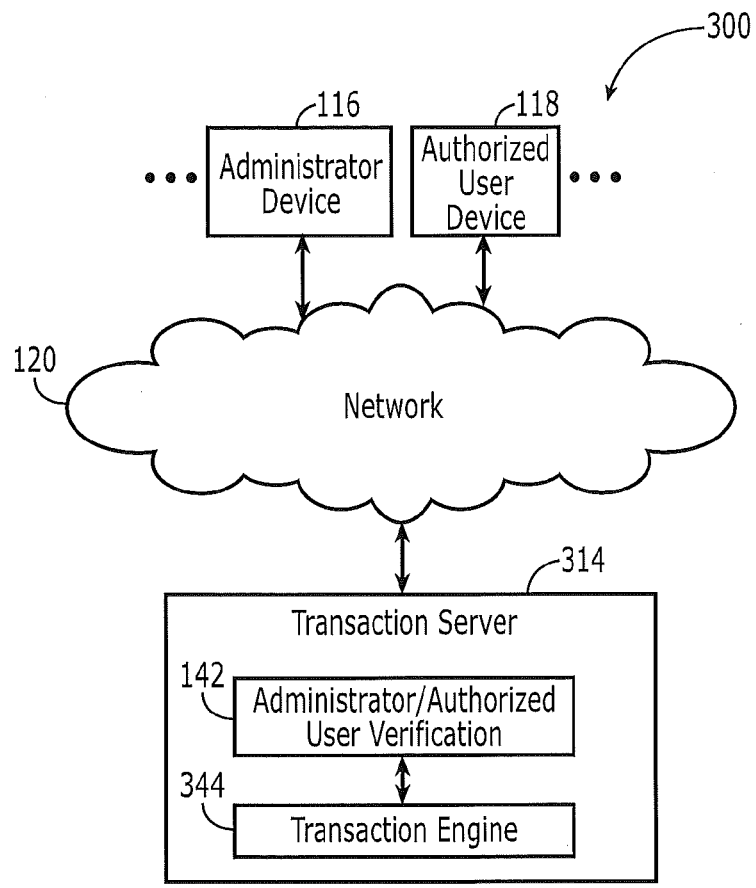

FIG. 3 is a block diagram of systems (including devices, such as server or sender/recipients devices), methods and/or computer program products for two-party, role-based transaction verification, according to still other embodiments described herein. These systems, devices, methods and computer program products 300 can process transactions such as purchases of goods or services online and/or at brick and mortar institutions in response to two-party, role-based verification. A transaction server 314 is provided that includes an administrator/authorized user verification module 142 and a transaction engine 344 that is configured to control the transactions. Administrator devices 116 and authorized user devices 118 communicate with the transaction server 314 via a network 120 and/or may directly communicate with the transaction server 314. Other devices, such as e-commerce servers, banking servers and/or store servers may also communicate with the transaction server 314 via a network 120 and/or may directly communicate with the transaction server 314.

Figure 4:
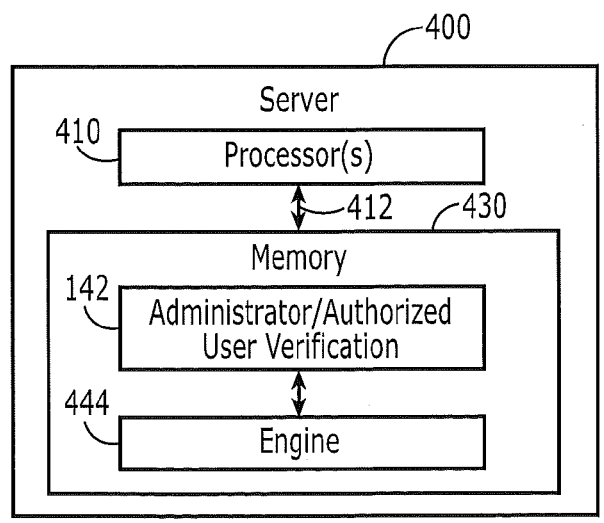
FIG. 4 is a block diagram of a server according to various embodiments described herein.

FIG. 4 is a block diagram of a data processing system/method/computer program product 400, such as may be embodied by an ESP server 146 of FIG. 1, a sender server 214 of FIG. 2, and/or a transaction server 314 of FIG. 3. Systems/methods/computer program products 400 may include a processor 410, such as one or more enterprise, application, personal, pervasive and/or embedded computer systems that may be standalone and/or connected by a wired and/or wireless, real and/or virtual, public and/or private network, including the Internet. A bus 412 connects the processor 410 with one or more memory devices 430 which may include solid state memory devices (such as static, dynamic, volatile and/or non-volatile solid state memory devices) and/or movable memories (such as rotatable magnetic and/or optical memory devices in the form of discs and/or tapes). The memory devices 430 may be arranged in a hierarchy of devices and may be standalone and/or connected by a wired and/or wireless, real and/or virtual, public and/or private network including the Internet. The memory devices 430 may store an administrator/authorized user verification module 142 of FIGS. 1-4 and an engine 444, such as the sending engine 144 of FIGS. 1-2 and/or the transaction engine 344 of FIG. 3. The verification module 142 and/or the engine 444 may be embodied by computer-readable program code that includes specific executable instructions. However, in other embodiments, the verification module 142 and/or engine 444 may be embodied, at least in part, by special purpose hardware including application-specific integrated circuits.

Two-Party, Role-Based Email Verification

Figure 5:
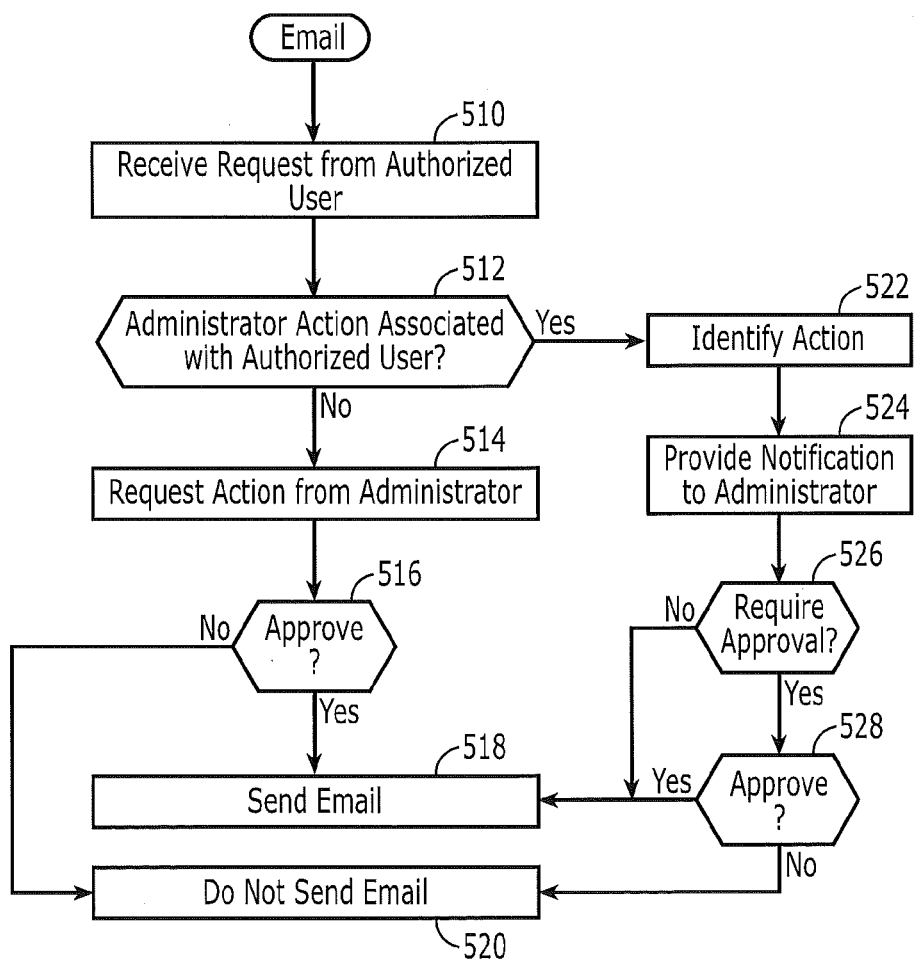
FIGS. 5 and 6 are flowcharts of operations that may be performed for sending emails according to various embodiments described herein.

FIG. 5 is a flowchart of operations that may be performed to send email from a sender to recipients in response to two-party, role-based email verification according to various embodiments described herein. In an ESP environment, these operations may be performed by the ESP server 146 of FIG. 1. In a non-ESP environment, these operations may be performed by a sender server 214 of FIG. 2.

Referring now to FIG. 5, at Block 510, a request is received from an authorized user, such as an authorized user device 118. At Block 512, determination is made as to whether administrator action has been associated with the authorized user. One technique of determining whether an administrator action has been identified with an authorized user is to determine whether the administrator has set a policy that applies to the authorized user. As used herein, a "policy" means one or more rules that are defined by an administrator, for example by selection from a set of predefined rules, and which apply to the particular request that is received. Many examples of selecting and processing a policy will be described in detail below in connection with FIGS. 6-13.

Still referring to FIG. 5, if it is determined that an administrator action is associated with the authorized user at Block 512, then at Block 522, the action is identified. At Block 524, notification is provided to the administrator. Moreover, if the action requires approval at Block 526, an opportunity is provided for the administrator to approve at Block 528. If the administrator does not approve at Block 528, then the email is not sent at Block 520. Moreover, if approval is not required at Block 526, or if the administrator approves at Block 528, then the email is sent at Block 518.

Alternatively, if an administrator action is not associated with the authorized user at Block 512, for example because the administrator has not yet selected a policy that relates to the authorized user, then an action is requested from the administrator at Block 514. The action may be requested of the administrator by requesting the administrator to select a policy, in which case operations may continue at the "yes" branch of Block 512. Alternatively, the action may be requested of the administrator by requesting the administrator to approve the sending of email at Block 516. At Block 516, if the sending of the email is approved, the email is sent at Block 518, and if it is not approved, it is not sent at Block 520. The sending of an email at Block 518 and/or not sending an email at Block 520 may also be accompanied by a notification to the authorized user as to the action that was taken.

Figure 6:
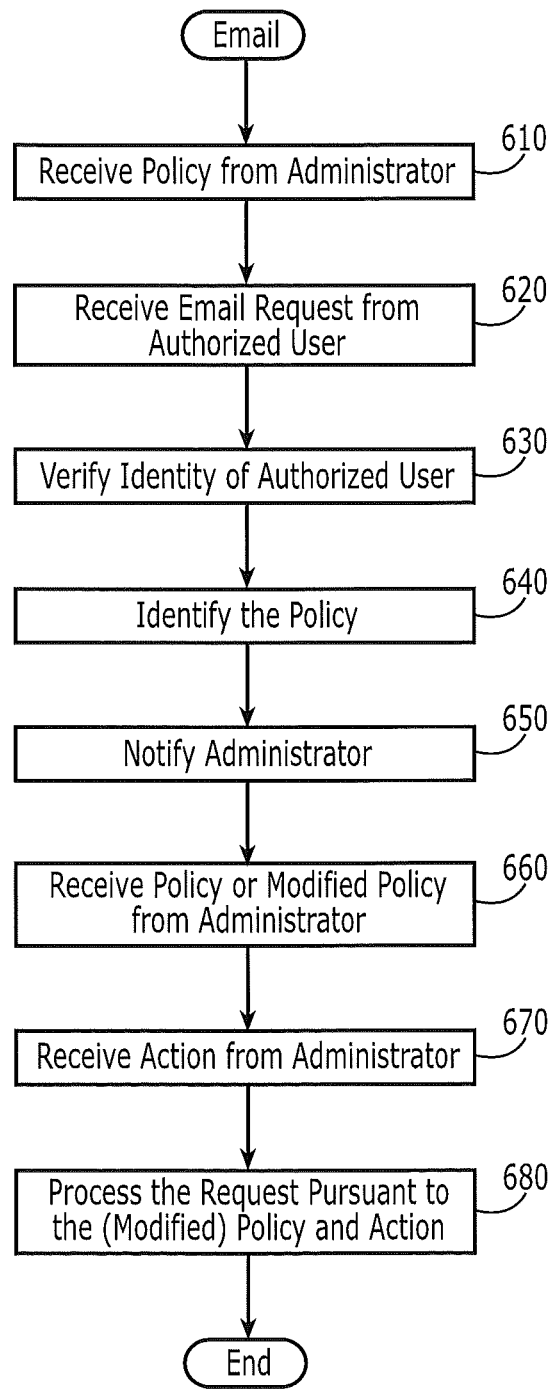

FIG. 6 is a flowchart of operations that may be performed to send email from a sender to recipients in response to two-party role-based email verification according to various other embodiments described herein. These embodiments control the sending of emails based on policy selections that are obtained/updated at various times. In an ESP environment, these operations may be performed by the ESP server 146 of FIG. 1. In a non-ESP environment, these operations may be performed by a sender server 214 of FIG. 2.

Referring now to FIG. 6, at Block 610, a policy is received from an administrator. The policy may be defined, for example, using various control panels that will be described below in connection with FIGS. 7-9. The policy may be received from the administrator when an authorized user is initially authorized, when an administrator is initially authorized or at various other times prior to receiving an email request from an authorized user at Block 620. In other embodiments, the operations of Block 610 need not be performed prior to receiving an email request from an authorized user at Block 620, but, rather, may be performed in response to receiving an email request from an authorized user at Block 620, as will be described in connection with Block 660 below.

After receiving the request from the authorized user to send an email message to a recipient at Block 620, some embodiments may verify the identity of the authorized user at Block 630. Many techniques may be used to verify the identity of the authorized user at Block 630 including, for example, sending a message to an email address of the authorized user and confirming that the authorized user replies to the message from that email address. Thus, a message may be sent to the authorized user at Block 630 in response to receiving a request to send an email to recipients at Block 620. The message may ask the authorized user to click on a link, which sends a reply email back to the server 146/214. Receipt of this message at the server 146/214 confirms that another individual is not falsely representing themselves as being the authorized user. Operations of Block 630 may also be incorporated into any of the other embodiments described herein.

Still referring to FIG. 6, at Block 640, the policy that applies to the particular email request of Block 620 is identified. Specifically, as will be described in detail below in connection with FIG. 7, the policy may be set to apply to all authorized users, to a specific authorized user, to a class of authorized users, to a class of emails and/or to other criteria that are set by the administrator. Thus, at Block 640, identifying a policy that applies includes making a determination as to which policy applies to the email request that was received at Block 620. Once the determination is made at Block 640, in some embodiments, the administrator is notified at Block 650. Specifically, some policies may include administrator notification, whereas other policies may not require administrator notification.

At Block 660, the administrator may provide the policy or may modify the policy that was provided earlier at Block 610. This policy or modified policy may be received in response to the notification of Block 650, wherein the notification provides a mechanism for the administrator to set or modify the policy, and/or may be provided by the administrator independent of the notification of Block 650.

Referring to Block 670, an action may be received from the administrator. The action may be received from the administrator when a policy requires an action, or independent of a policy. Various administrator actions will be described in detail in connection with the control panel of FIG. 9.

Finally, at Block 680, the email request of Block 620 is processed, for example by delivering the email, not delivering the email, delivering the email in a degraded mode and/or delivering the email in an enhanced mode, responsive to the policy that was received at Block 610 or the policy that was received or modified at Block 660, and the action (if any) that was received from the administrator at Block 670. Examples of how requests may be processed according to various embodiments described herein will be provided in connection with FIGS. 10-13. The authorized user may also be notified about the disposition of the request as part of the processing at Block 680.

Accordingly, FIG. 6 illustrates email sending according to various embodiments described herein, wherein a policy is received from an administrator at Block 610 that defines email sending activity allowed by an authorized user. A request is received from an authorized user to send an email message to a recipient at Block 620. A determination is made at Block 680 as to whether the request that was received from the authorized user at Block 620 should be denied or approved based on the policy that was received from the administrator at Block 620 and/or 660.

FIG. 6 also illustrates email sending according to various other embodiments described herein, wherein a request is received from an authorized user at an email sender to send an email from the email sender to recipients at Block 620, and wherein a policy associated with the authorized user is identified at Block 640. A notification is sent at Block 650 based, at least in part, on the identified policy, in response to receiving the email request at Block 620. The email is then sent from the email sender to the recipients at Block 680 in response to receipt of an action from the administrator at Block 670, wherein the action is at least, in part, identified by the policy.

FIG. 7-9 illustrate control panels that may be used by an administrator to set a policy and to provide administrator action, according to various embodiments described herein. The control panel of FIG. 7 allows an administrator to set a given user, class of users or other criteria to which the policy applies. The control panel of FIG. 8 allows the administrator to set the policy rules. The control panel of FIG. 9 allows the administrator to provide administrator actions. Other forms of user interfaces may be provided.

More specifically, the control panel of FIG. 7 allows an administrator to specify to which user, group of users, emails or transactions a policy applies, and may be used in connection with Block 512 of FIG. 5 and Block 640 of FIG. 6. The control panel of FIG. 7 may allow an administrator to set a policy that applies to all authorized users, to a specific authorized user that is identified, for example, by a user ID, email address, etc., to a class of authorized users that may be identified by user IDs, email addresses or a group identification, or a class of emails, for example emails related to a specific campaign, or that relate to purchases over a certain dollar amount. Various other options may be provided.

FIG. 8 illustrates a control panel of policy rules that may be presented to the administrator in connection with Blocks 610 and/or 660 of FIG. 6 to allow the administrator to set/define/modify policy rules. Four rules or options are illustrated in FIG. 8. Upon selecting the first option, a policy is created for the users/classes of FIG. 7, that does not allow the email initiated by the authorized user to be sent (either to the recipient or to the ESP) until approval is received from the administrator. If the administrator selects the second option, a policy is created that allows an email to be sent upon failure of the administrator to disapprove within a given period of time, which may be selected by a drop-down box or other technique such as a slider. Even though the second option shown in FIG. 8 illustrates "days," the administrator could set any other approval period of time as well (e.g., minutes, hours, etc.). The third option allows the administrator to set a policy allowing the email to be sent upon providing a notification to the administrator. Selecting the fourth option allows the administrator to limit an authorized user's activity to a "degraded mode" (e.g., not provide full access) until the administrator provides approval or fails to disapprove within a given time.

Referring back to FIG. 6, at Block 660, the received policy rules are processed to determine a required administrator action, if any. For example, if the administrator defines a policy that includes either the first option or the fourth option shown in FIG. 8, the administrator may be prompted for approval/disapproval upon the authorized user performing an action (e.g., attempting to send an email). FIG. 9 illustrates one example prompt that may be presented to the administrator to approve, disapprove or defer approval/disapproval to a later time. Suppose, for example, the administrator sets a policy that applies to a given authorized user that requires the administrator's approval prior to sending an email message provided by the authorized user. Upon receiving a request to send the email, the administrator may select "I do not approve" in FIG. 9, causing the email provided by the authorized user to not be sent. Various other combinations of account owner options and account owner authorizations may be provided.

FIG. 6 may be embodied in the ESP environment according to the following example scenario: Suppose that user A is the administrator of an ESP account for her company "Electronics Warehouse" and fellow employee User B is a lower-privilege user of the ESP account (e.g., User B has permission to utilize the ESP account to send email to customers of Electronics Warehouse, and suppose that the ESP, prior to sending any emails, requires a source email address in order to authenticate the user (e.g., the ESP sends User B an email that requires User B to perform an action). In addition to the ESP sending User B an authentication email, the ESP sends a notification to User A of User B's activity.

Depending on the policy defined by User A (or anyone else at Electronics Warehouse), several actions may occur:

1. If the policy is set to implicitly trust User B's actions, then the notification provided to User A is provided simply for notification/informational purposes only, and the ESP proceeds to send the email.

2. If the policy requires explicit approval of User B's actions, then, in one embodiment, the notification may include a URL, reference, drop-down box and the like that requires User A to approve/deny User B's actions. In this instance, the ESP will not deliver email messages until approved by User A, and may notify User B if User A denies the request.

3. If the policy allows email delivery to occur unless User A disapproves within a certain period of time, the ESP will proceed as requested by User B. However, if User A terminates the request within the defined period of time, the ESP will cease to send further email messages.

Figure 10:
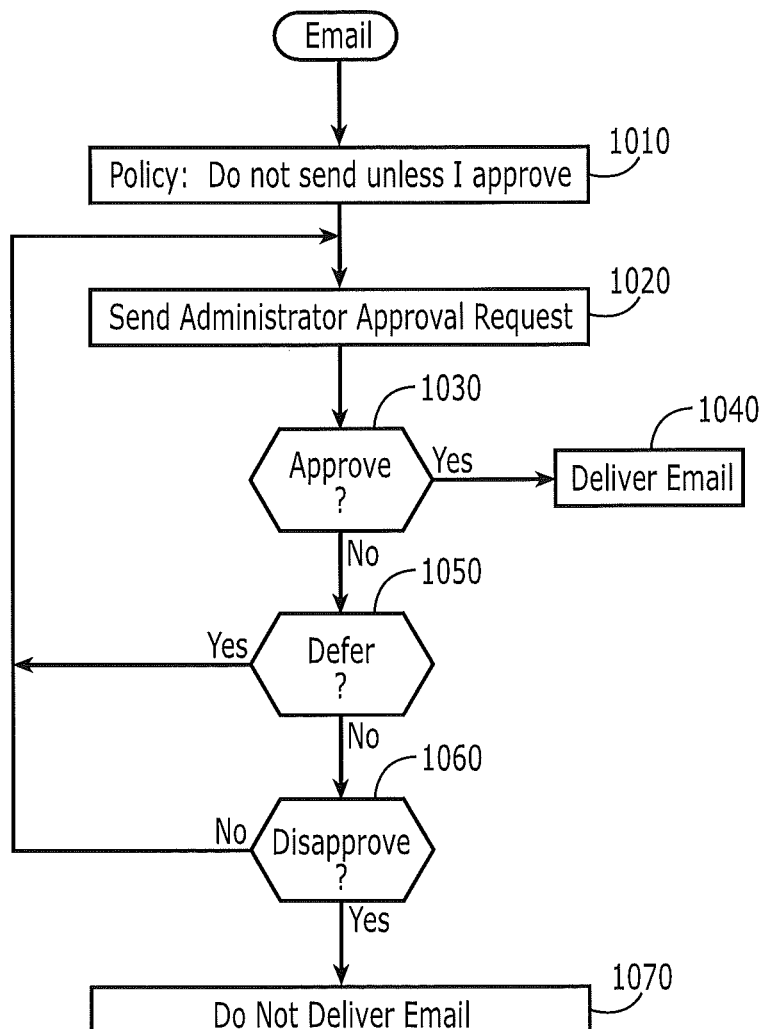
FIGS. 10-13 are flowcharts of operations that may be performed to deliver an email pursuant to various policies according to various embodiments described herein.

FIGS. 10-13 are flowcharts of operations that may be performed to deliver an email pursuant to various policies, according to various embodiments described herein. Referring to FIG. 10, at Block 1010, the policy is set or modified pursuant to Blocks 610/660 of FIG. 6, to state "Do not send unless I approve" pursuant, for example, to option 1 of FIG. 8. Assume that an email request is received from an authorized user, either before or after the policy is set or modified, as was described at Block 620 of FIG. 6. Then, at Block 1020, an administrator approval request is sent, for example using the control panel of FIG. 9. Assume that an action is received from the administrator, for example pursuant to Block 670 of FIG. 6. If the action is to approve at Block 1030, then the email is delivered at Block 1040. If the action at Block 1030 is not an approval, then a determination is made at Block 1050 as to whether the action is to defer and, if so, an administrator approval request is again sent at Block 1020 at a later time. On the other hand, if the administrator action is not to defer at Block 1050, a determination is made as to whether the administrator did not approve at Block 1060. If disapproval was provided, the email is not delivered at Block 1070. If disapproval was not provided, then an administrator approval request may be sent again at Block 1020 at a later time. It will be understood that the processing of the approve, defer and disapprove options may occur in any sequence.

Figure 11:
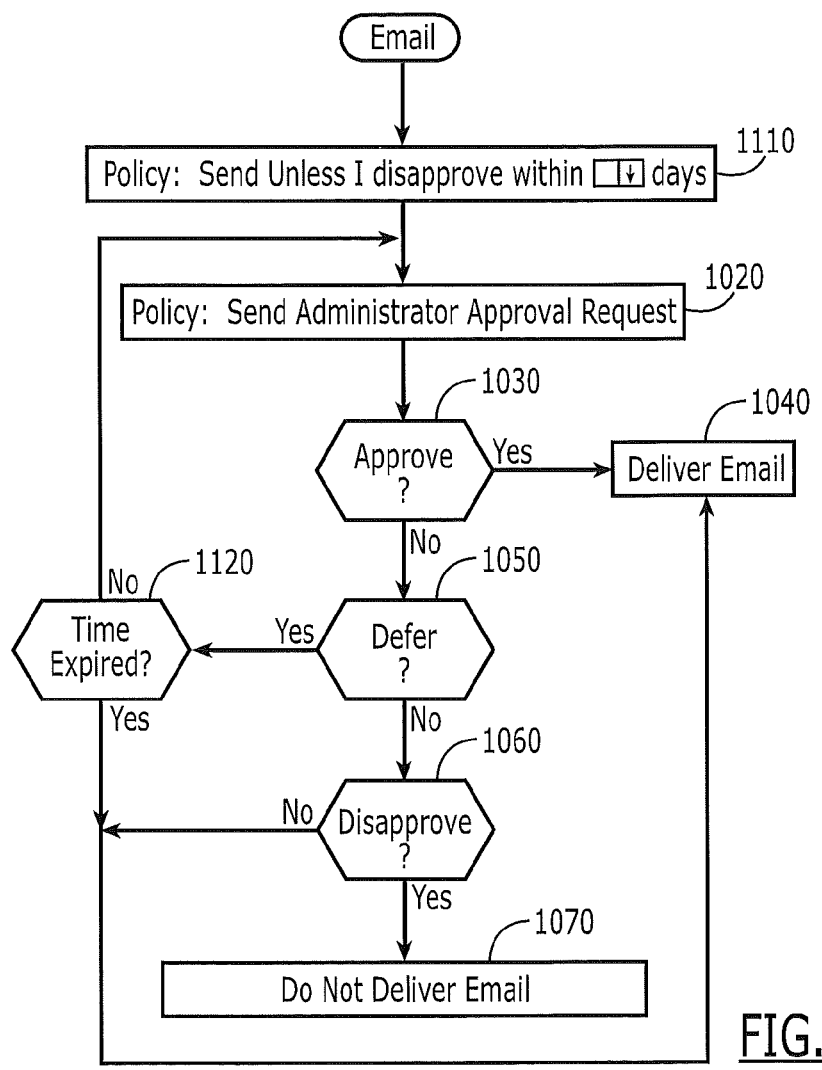

FIG. 11 is a flowchart of operations that may be performed to deliver an email pursuant to various policies, according to various other embodiments described herein. Referring to FIG. 11, at Block 1110, the policy is set or modified pursuant to Block 610/660 of FIG. 6, to state "Send unless I disapprove within _____ days" pursuant, for example, to option 2 of FIG. 8. Assume that an email request is received from an authorized user, either before or after the policy is set or modified, as was described at Block 620 of FIG. 6. An administrator approval request is then sent pursuant to Block 1020. If approval is obtained pursuant to Block 1030, email is delivered at Block 1040. On the other hand, if an approval is not obtained at Block 1030, a determination is made as to whether the action is to defer at Block 1050. If so, a determination is made at Block 1120 as to whether the selected time has expired. If the time has expired at Block 1120, then the email is delivered at Block 1040. If the time has not yet expired at Block 1120, then the approval request is resent at Block 1020 before expiration of the selected time. On the other hand, if deferral was not selected at Block 1050, a determination is made at Block 1060 as to whether disapproval was selected, and, if so, the email is not delivered at Block 1070.

Figure 12:
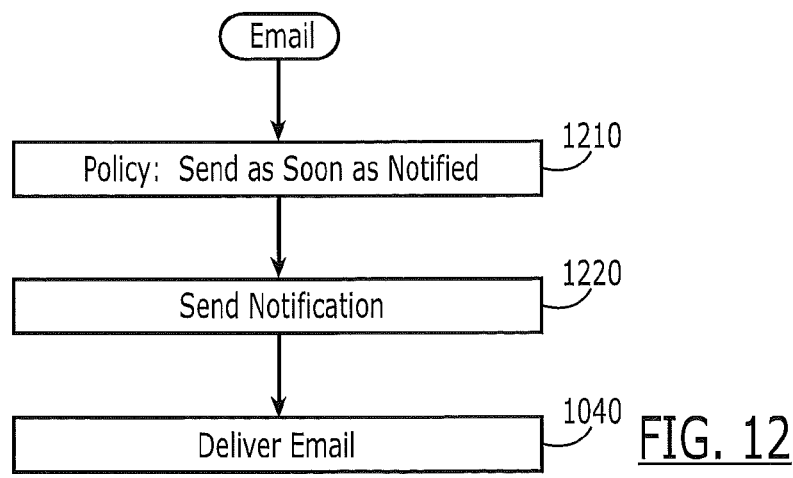

FIG. 12 is a flowchart of operations that may be performed to deliver an email pursuant to various policies, according to various other embodiments described herein. Referring to FIG. 12, at Block 1210, the policy is set or modified pursuant to Blocks 610/660 of FIG. 6, to state "Send as soon as I am notified", for example pursuant to option 3 of FIG. 8. Assume that an email request is received from an authorized user, either before or after the policy is set or modified, as was described at Block 620 of FIG. 6. In this case, a notification is sent at Block 1220, which may correspond to the operations of Block 650, and the email is then delivered pursuant to Block 1040.

Figure 13:
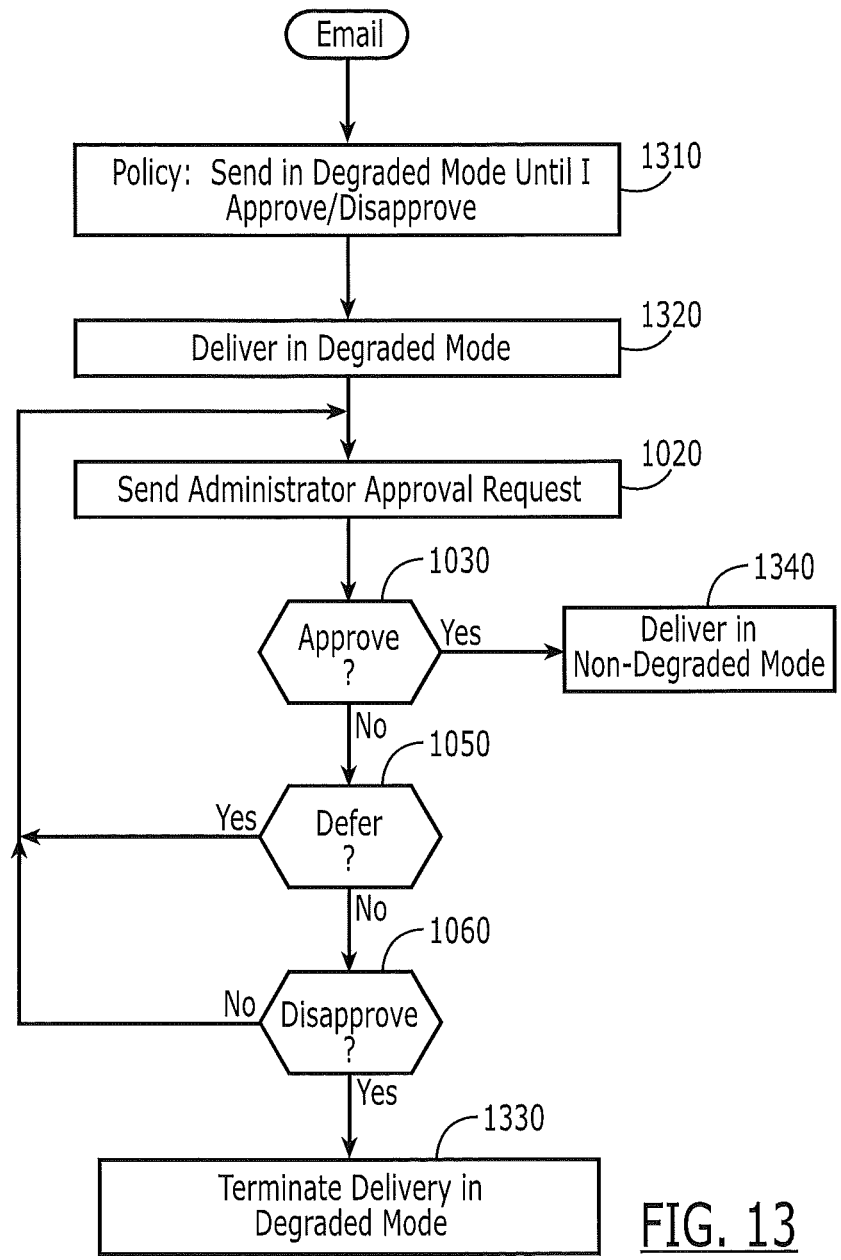

FIG. 13 is a flowchart of operations that may be performed to deliver an email pursuant to various policies, according to various other embodiments described herein. Referring to FIG. 13, the policy is set or modified pursuant to Blocks 610/660 of FIG. 6, to state "Send in degraded mode until I approve or disapprove" pursuant to the option 4 of FIG. 8. Assume that an email request is received from an authorized user, either before or after the policy is set or modified, as was described at Block 620 of FIG. 6. At Block 1320, delivery of the email begins in degraded mode. An approval request is then sent, pursuant to Block 1020, and a determination takes place as to whether the action is approval at Block 1030, deferment at Block 1050 or disapproval at Block 1060, as was described above. However, in embodiments of FIG. 13, if disapproval is received at Block 1060, then the delivery is terminated at Block 1330. Moreover, if approval is received at Block 1040, then at Block 1340, email delivery is provided in non-degraded mode.

A degraded mode may, for example, allow the sending engine 144 to begin sending the emails to recipients at, for example, a lower rate (i.e., fewer emails per hour or fewer emails per recipient) than would be provided at a "normal" rate of operation. Thus, although the sending of emails has begun, the rate of emails sent will not reach a full contracted-to rate until the administrator approves to proceed at the "normal" rate, either explicitly or by default. This degraded mode operation may also be referred to as "metering" or "throttling" the emails, i.e., limiting the rate of sending email to a certain level. The metered level may correspond to an initial "sandbox" rate that is used by an ESP for a new customer.

Various other forms of degraded mode email sending may be provided. For example, a "queued only" degraded mode may be provided where emails appear to have been sent, but are only queued for delivery. Alternatively, emails are queued and the authorized user is informed that they are queued and require approval to be sent. "Vetted parties only" degraded mode may send emails only to a prescribed list of recipients, but not to new recipients or recipients that have not been vetted as desiring to receive email. Accordingly, in the "vetted parties only" degraded mode, the emails may be sent to a "core audience" only, which is then expanded in non-degraded mode. Still another example of degraded mode is a "security-constrained plain text only, no attachments" degraded mode, where only emails that meet a prescribed set of security requirements are sent. Potential adverse affects may thereby be limited, absent authorization (explicit or by failure to disapprove in a given time). Yet another example of degraded mode is limiting the number of email campaigns that can be initiated within a given time by a given authorized user or by all authorized users, so as to limit the potential financial risk to the email sender absent authorization (explicit or by failure to disapprove in a given time). Various other embodiments of degraded mode email processing may be provided.

Figure 14:
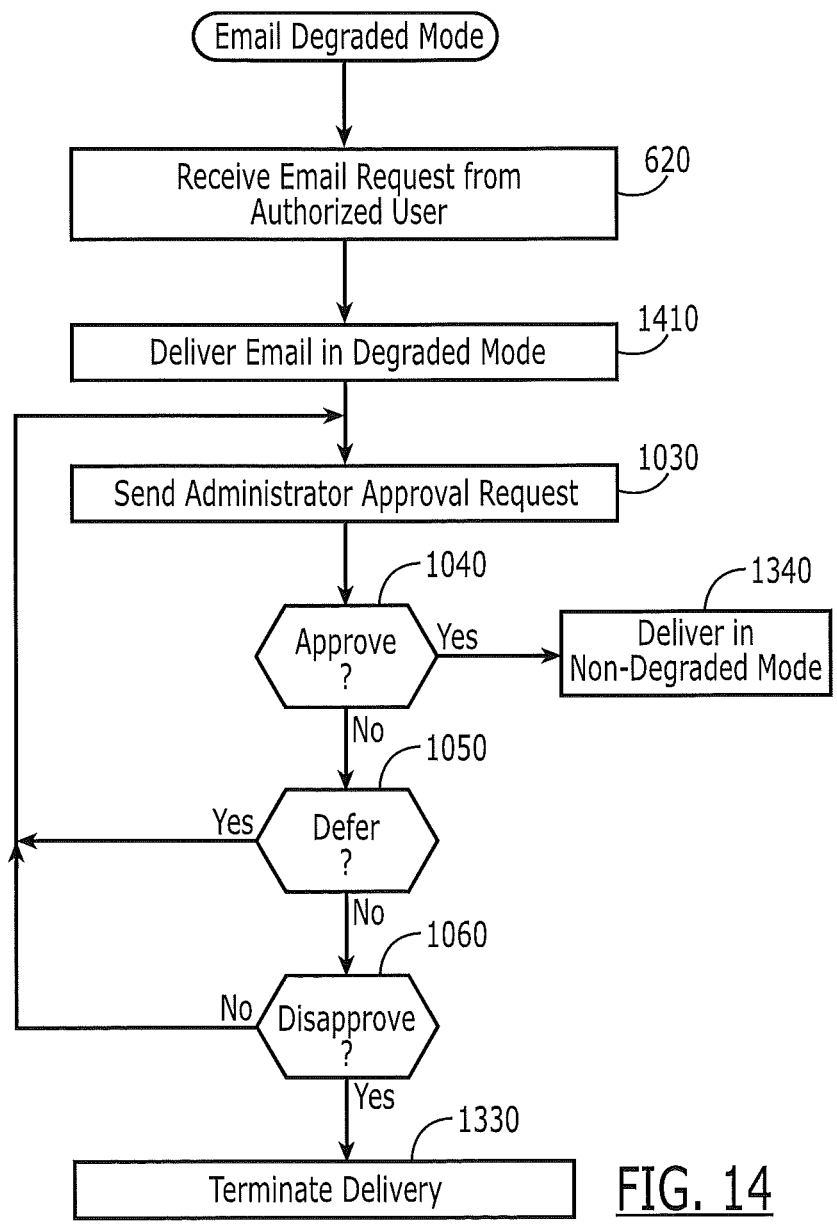
FIG. 14 is a flowchart of operations that may be performed to send email in a degraded mode according to various embodiments described herein.

Degraded mode as described in connection with FIG. 13 can also be provided for email sending independent of an explicit selection of a degraded mode policy. For example, embodiments of FIG. 14 may be provided to automatically deliver email to recipients in a degraded mode at Block 1410 in response to receiving an email sending request from an authorized user at Block 620. Operations of Blocks 1030, 1040, 1050, 1060, 1330 and 1340 are then performed.

E-Commerce Two-Party, Role-Based Transaction Verification

Various embodiments described above in connection with email may also be used in connection with e-commerce transactions, as will now be described. In e-commerce scenarios, an e-commerce transaction may be performed, for example with an online seller of products or services, for an account that was opened by an account owner, for example a parent, and that provides one or more authorized users, such as children, a limited authorization to use the account. Thus, for example, the children may be allowed to make purchases using the account, but the purchase may not be completed until an approval from the parent is obtained.

Figure 15:
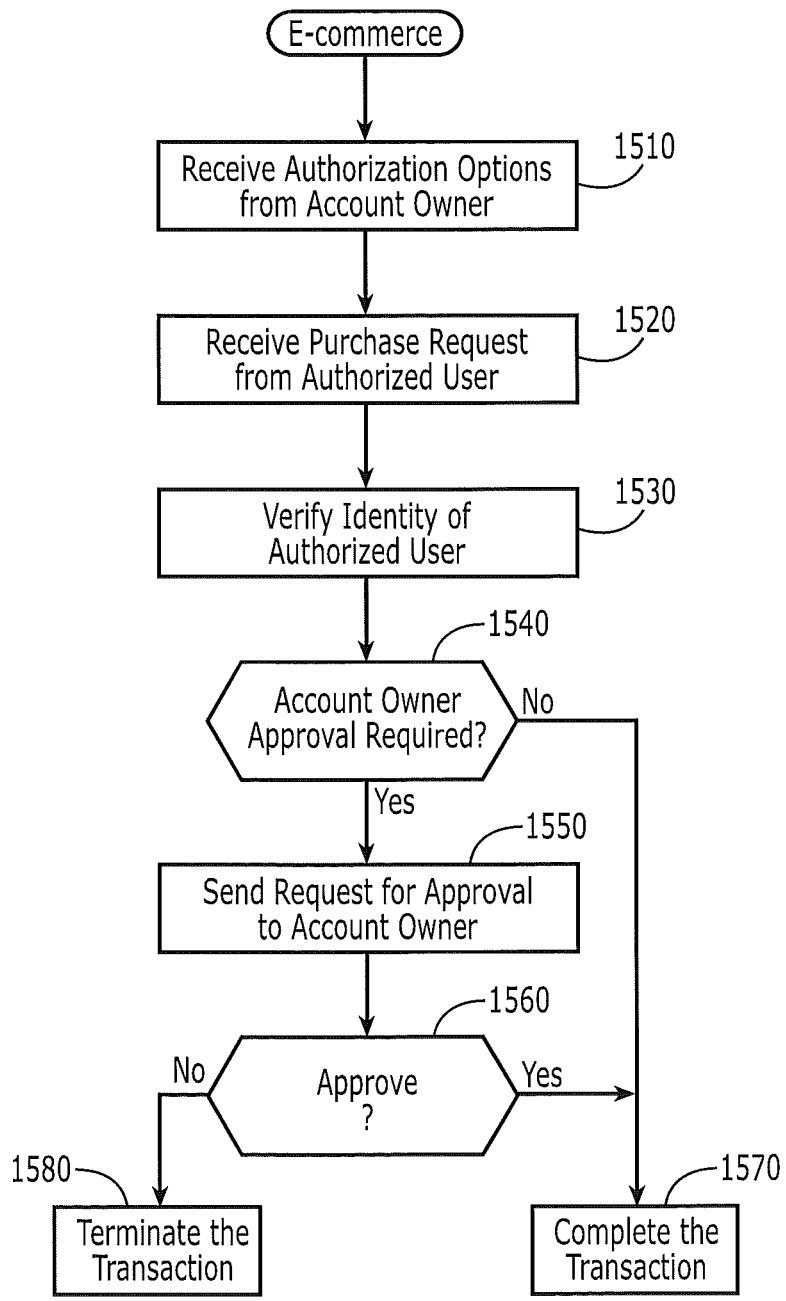
FIG. 15 is a flowchart of e-commerce operations that may be performed according to various embodiments described herein.

FIG. 15 is a flowchart of e-commerce operations that may be performed according to various embodiments described herein. These operations may be performed, for example, by the transaction server 314 of FIG. 3.

Referring now to FIG. 15, at Block 1510, authorization options are received from the account owner. The authorization options may be analogous to the policies that were discussed above, but may be adapted to the e-commerce scenario. Then, at Block 1520, a request is received for the authorized user to perform an e-commerce transaction. For example, a request may be received from an e-commerce website to purchase a product by the authorized user, for example, a child. At Block 1530, the identity of the authorized user may be verified, as was described above in connection with Block 630 of FIG. 6, and/or using other techniques. A determination is made at Block 1540 whether account owner approval is required pursuant to the authorization options set forth at Block 1510. If required, a request for approval is then sent to the account owner at Block 1550. For example, an email message may be sent by the transaction server 314 to the account owner device 116, such as a device operated by a parent, requesting approval of the account owner. The email message may provide access to control panels analogous to FIGS. 7, 8 and/or 9 as were described above. These control panels may be adapted to the e-commerce environment. For example, an additional option may be provided in FIG. 8 to "Automatically approve if amount is less than $_____", with a drop-down box or slider provided to select the amount. Other options to approve by transaction frequency, type, source, etc., may be provided. A determination is then made at Block 1560 as to whether approval is received. If yes, then the transaction is completed at Block 1570. If not, the transaction is terminated at Block 1580.

In the e-commerce scenario of FIG. 15, a degraded mode may also be applied prior to approval. The degraded mode may involve preparing the goods for delivery, but not delivering the goods until approval is received at Block 1560. For example, the child may think they are buying pursuant to a parent's pre-authorization, for example, at $100 per month, but there is an approval required for shipping. Other scenarios of degraded mode e-commerce may include "age-appropriate", where items that are pre-rated as age-appropriate or do not exceed a configured maturity rating threshold (G, PG, PG-13 or, for games E for "Everyone", T for "Teen", M for "Mature") are sent without delay, but those items that are not age-appropriate are held until explicit parental approval. Another scenario may involve "target date wish lists", where existing wish list functionality allows self-purchase/selection of items that will not actually be purchased until the explicit approval and target date selection, such as a birthday, Christmas, etc. Other scenarios of degraded mode in e-commerce may also be provided.

Degraded Mode with Two-Party, Role-Based Transaction Verification

Figure 16:
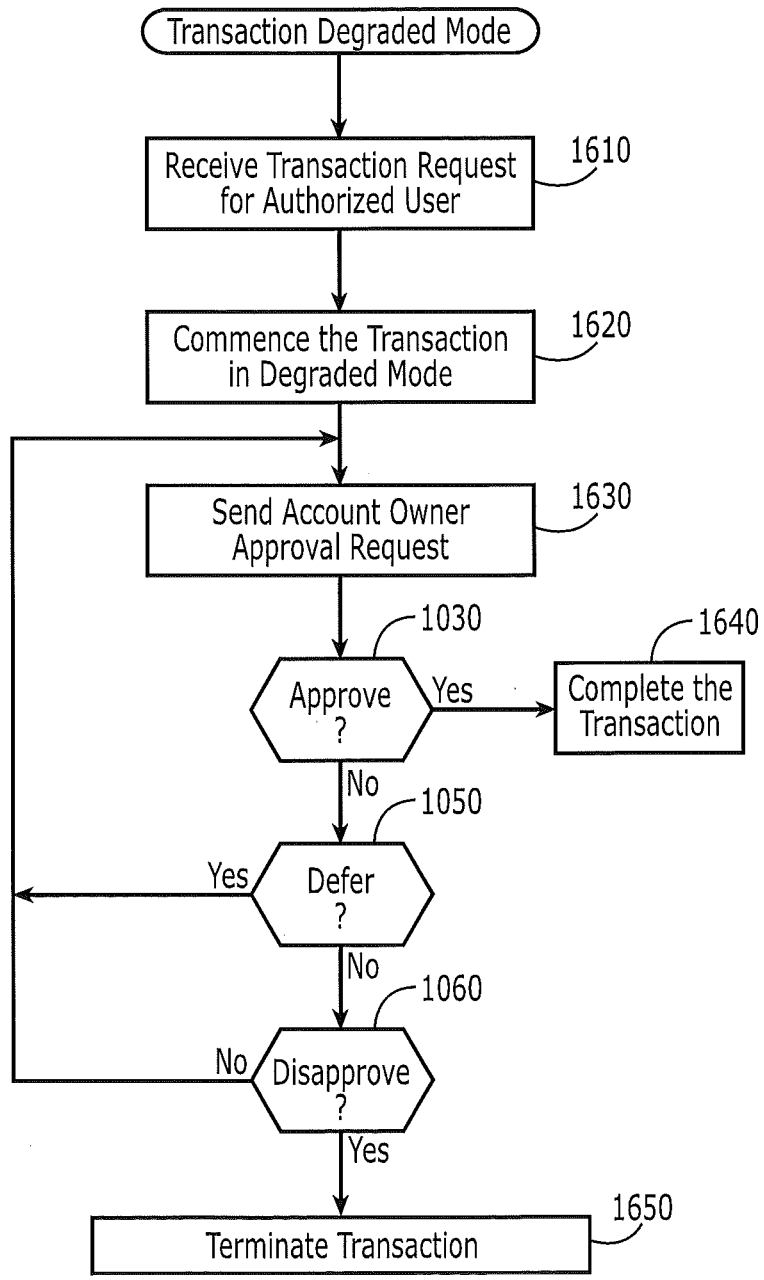
FIG. 16 is a flowchart of operations that may be performed to process transactions according to various embodiments described herein.

FIG. 16 is a flowchart of operations that may be performed to process a transaction using a degraded mode according to various embodiments described herein. These operations may be performed, for example, by the transaction server 314 of FIG. 3. For example, these operations may be performed by a parent to control use of a debit card by a child to withdraw cash or by a parent to control bricks-and-mortar purchases using a credit/debit card by a child.

Referring to FIG. 16, at Block 1610, a request to perform a transaction for an authorized user is received from a store, bank or other institution. At Block 1620, processing of the transaction in a degraded mode is commenced. Thus, for example, in a retail store, a preliminary approval may be obtained, and the clerk may begin to wrap or pack the purchase. Alternatively, an ATM may accept a PIN number and begin to count, but not dispense, the cash. Then, at Block 1630, a request for approval is sent, and operations of Blocks 1030, 1050 and 1060 are performed. In response to receipt of an authorization from the account owner at Block 1030, the processing of the transaction is continued in non-degraded mode at Block 1640. For example, in a retail store, the packed/wrapped goods are conveyed to the child to complete the transaction. Alternatively, the cash that was previously counted may be dispensed. When authorization is denied at Block 1060, transaction processing is terminated at Block 1650.

Various degraded mode scenarios may be provided for the transaction processing environment. For example, in a "partial payment" degraded mode, a partial amount is transferred to satisfy a good faith portion of a contract, while still providing verifiable guarantee of eventual full funds transfer to the receiving party.

Moreover, an option to provide an "enhanced mode" or "premium mode" processing, that is enhanced relative to the non-degraded mode, may also be provided according to various embodiments described herein. In an enhanced mode, although the authorized user, such as the child, wishes to purchase the goods or services in a normal mode, various embodiments herein may allow an account owner, such as a parent, to authorize the purchase of the goods in an enhanced or premium mode, so as to add various purchasing options that were not selected by the child.

For example, an "insured vs. uninsured transaction" enhanced mode may allow a silent premium to be added by the account owner during payment verification, to ensure that the authorized user can get their money back for the purchase, or to purchase insurance for the product. Thus, the account owner can approve completion of the transaction in an enhanced mode, for example by adding insurance or a money back premium to the normal mode that was selected by the authorized user. Yet another example is a "liable vs. non-liable" mode, wherein if the account owner does not provide confirmation in a timely manner, the transaction will occur, and incur a premium, but the bank will be held liable in the event of a fraudulent transaction, compared to if the account owner confirms the release of funds, possibly at a discount, and the bank cannot be held liable for a fraudulent transaction. Accordingly, risk may be transferred if accepted by the account owner from the bank to the payor. Yet another example of an enhanced mode is a "non-obvious payment under duress" scenario, wherein in situations of duress, such as a mugging, holdup or bribery, if account owner confirmation does not occur, payment will still occur and authorities may be automatically notified that a payment under duress was made. Thus, in this enhanced mode, the criminal party would not be aware of the difference, so as to place the distressed party in further jeopardy, but the bank could still be notified.

Various other embodiments of degraded mode scenarios and/or enhanced mode scenarios may be provided. Moreover, enhanced mode processing may be provided in e-commerce environments and in email sending environments, as well. For example, in e-commerce environments, enhanced mode may provide a faster and more expensive shipment of the product than that which was selected by the authorized user. As another example, a parent may specify the purchase of new goods rather than used or refurbished goods. Moreover, in the email sending scenario, emails may be sent at a higher rate than normal upon administrator approval, to at least partially compensate for the lower rate that was used before administrator approval.

Additional Discussion

Additional discussion of various embodiments of two-party, role-based verification will now be provided.

In particular, in the ESP environment of FIGS. 1 and 4-14, in order to provide a service that allows a user to send email purporting to be from a particular sender, it is desirable to verify that the requesting user is the actual user of the email address and/or the owner of the email domain, in order to prevent fraud and abuse associated with the service, such as phishing and spamming. Mechanisms exist to perform this verification. However, in the context of an email service, where an account owner may delegate authorization of email sending activities to one or more account sub-owners or authorized users, i.e., role-based access control within the service, various embodiments provided herein can provide additional measures to, at a minimum, inform the account owner (i.e., the primary service account holder/administrator) and, in some embodiments, provide a mechanism that provides independent authorization of the authorized user's activities by the account owner.

In some embodiments, wherein an authorized user utilizes the email service to create an email address that will be verified by the ESP service, a verification mechanism may be provided, for example, using a link within an email to click, that contains a unique token or may lead to a Web page to log in and confirm the initial request. However, the administrator may also wish to be informed of this activity and/or to have the ability to independently authorize the activity. Thus, in some embodiments, a separate email with an additional unique link or other confirmation mechanism may be sent to the administrator. Modes or options can be preset to account for operational timeliness that is associated with the administrator activity, such that, for example, the activity is not authorized unless and until the administrator follows the link or performs the confirmation action; the activity proceeds, but in a degraded or less powerful mode while awaiting the administrator's authorization; or the activity temporarily proceeds as initially requested while the administrator is informed and has the option to de-authorize for a time period until full delivery or the activity is finished.

This type of two-party, role-based verification of activities or independent authorization of requests or orders to be completed upon independent verification/authorization may also be applied to compute and storage creation operations, ordering of items, etc.

Accordingly, various embodiments described herein can apply a "two man missile-launch authorization" mechanism to verification of role-based actions in third party email service. Thus, no single individual can perform a significant activity, such as launching an email that purports to be from a particular email sender, without a separate, independent confirmation and concurrence with the activity.

Various embodiments described herein can provide scalable, third-party service solutions for sending email from a verified email address, by requiring independent verification mechanisms, to reduce or eliminate potential fraud and abuse, which, if not properly mitigated, can lead to mistrust and even global blocking of the third-party service. Other uses of such a mechanism could be for periodic auditing and confirmation of authorized user activity. For example, notification may be provided of a delegated user's creation of computer storage that exceeds predefined thresholds and requires independent authorization. Moreover, in some embodiments, a parent can authorize a pre-debit amount of store credit for children, and after the child completes the check-out process, the parent is notified and the order is held until the parent provides independent authorization for the purchase, for example, after a cursory review of what is being purchased.

Various embodiments have been described fully herein with reference to the accompanying figures, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and were described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD-ROM) or a Blu-Ray® disc.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An email sending method, performed under control of one or more computer systems configured with specific executable instructions, comprising:
    obtaining a policy from an administrator of a verified email address through a control panel provided by an email sending engine, wherein the policy defines email sending activity for the verified email address allowed by an authorized user of the verified email address and wherein ownership of the verified email address has been previously authenticated by the email sending engine;
    receiving a request from the authorized user to send, via the email sending engine, an email message originating from the verified email address to a recipient email address determining whether the request that was received from the authorized user should be denied or approved based on the policy; and
    sending the email message in response to determining that the request should be approved based on the policy.

2. A method according to claim 1 further comprising:
    sending the email message to the recipient email address in response to determining that the request that was received from the authorized user should be approved.

3. A method according to claim 1 wherein the control panel is a first control panel and further comprising:
    notifying the administrator of the request that was received from the authorized user to send the email message to the recipient email address; and
    receiving, through a second control panel provided by the email sending engine, a modified policy from the administrator in response to the notifying, wherein the modified policy modifies the email sending activity allowed by the authorized user that was defined.

4. A method according to claim 1 wherein the policy further defines the email sending activity allowed by a plurality of authorized users that include the authorized user.

5. A method according to claim 1 wherein the policy comprises sending the email message only upon approval of the administrator, sending the email message upon failure of the administrator to disapprove within a given time, sending the email upon a notification of the administrator or sending the email message in a degraded mode until approval of the administrator or until failure of the administrator to disapprove within the given time, wherein the degraded mode comprises sending the email message to the recipient email address at a lower rate than a normal rate of operation.

6. A method according to claim 2 wherein obtaining the policy, receiving the request, determining whether the request was received, and sending the email message are performed by the email sending engine.

7. An email sending method, performed under control of one or more computer systems configured with specific executable instructions, comprising:
    receiving a request from an authorized user to send an email from a verified email address to a recipient, wherein ownership of the verified email address has been previously authenticated by an email sending engine;
    identifying a policy associated with the authorized user, wherein the policy has been previously submitted by an administrator of the verified email address through a control panel provided by the email sending engine;
    sending a notification, based at least in part on the identified policy, to the administrator in response to receiving the request; and
    sending the email from the verified email address to the recipient in response to a receipt of an action by the administrator, through the control panel provided by the email sending engine, in response to the notification, wherein the action is at least in part identified by the policy.

8. A method according to claim 7 further comprising:
    receiving, via the control panel provided by the email sending engine, a modified policy from the administrator in response to the notification, wherein the modified policy modifies the policy associated with the authorized user.

9. A method according to claim 7 wherein the policy defines email sending activity allowed by the authorized user.

10. A method according to claim 7 wherein the policy further comprises sending the email only upon approval of the administrator, sending the email upon failure of the administrator to disapprove within a given time, sending the email upon notification of the administrator, or sending the email in a degraded mode until approval of the administrator or until failure of the administrator to disapprove within the given time.

11. A method according to claim 7 wherein the following is performed between receiving the request and sending the notification:
   verifying an identity of the authorized user.

12. A method according to claim 11 wherein verifying further comprises sending a message to an email address of the authorized user and confirming that the authorized user replies to the message from the email address of the authorized user.

13. A method according to claim 7 wherein sending the email from the verified email address to the recipient in response to the receipt of the action by the administrator in response to the notification further comprises:
   providing the email from the verified email address to the recipient in a degraded mode in response to receiving the request from the authorized user to send the email to the recipient; and
   providing the email from the verified email address to the recipient in a non-degraded mode in response to the receipt of the action by the administrator.

14. A method according to claim 13 wherein the non-degraded mode comprises a faster rate of sending the email from the verified email address to the recipient than the degraded mode.

15. A computer program product for operating a server, the computer program product comprising a non-transitory computer-readable medium having computer-readable program code executable by the server, the computer-readable program code being configured to cause the server to perform the method of claim 7.

16. An email sending method, performed under control of one or more computer systems configured with specific executable instructions, comprising:
   receiving a request from an authorized user to deliver an email message from a verified email address to a recipient, wherein ownership of the verified email address has been previously authenticated by an email sending engine;
   providing the email message from the verified email address to the recipient in a degraded mode in response to receiving the request from the authorized user to deliver the email message to the recipient;
   receiving, via a control panel provided by the email sending engine, an authorization from an administrator of the verified email address to remove the degraded mode; and
   providing the email message from the verified email address to the recipient in a non-degraded mode in response to the authorization that was received.

17. A method according to claim 16 further comprising:
   terminating the providing of the email message from the verified email address to the recipient in response to disapproval from the administrator.

18. A method according to claim 16 wherein the non-degraded mode comprises a faster rate of sending the email to the recipient than the degraded mode.

19. A method according to claim 16 further comprising receiving from the administrator, an identification of a degraded mode policy that defines email message sending activity in the degraded mode.

20. A method according to claim 16:
   wherein receiving the authorization from the administrator of the verified email address to remove the degraded mode comprises receiving the authorization from the administrator to provide the email message in an enhanced mode that is enhanced relative to the non-degraded mode; and
   wherein the method further comprises providing the email message from the verified email address to the recipient in the enhanced mode in response to the authorization that was received.

21. A transaction processing method, performed under control of one or more computer systems configured with specific executable instructions, comprising:
   receiving a request to perform a transaction for an authorized user of a verified email account, wherein ownership of the verified email account has been previously authenticated by an email sending engine;
   performing the transaction in a degraded mode in response to receiving the request to perform the transaction for the authorized user of the verified email account;
   receiving, via a control panel provided by the email sending engine, an authorization from an owner of the verified email account to remove the degraded mode; and
   performing the transaction in a non-degraded mode in response to receiving the authorization.

22. A method according to claim 21 further comprising:
   terminating the transaction in response to disapproval from the owner of the verified email account.

23. A method according to claim 21:
   wherein receiving the authorization from the owner of the verified email account to remove the degraded mode comprises receiving the authorization from the owner of the verified email account to provide the transaction in an enhanced mode that is enhanced relative to the non-degraded mode; and
   wherein the method further comprises performing the transaction in the enhanced mode in response to the authorization that was received.

24. A method according to claim 21:
   wherein the transaction comprises a sale of goods;
   wherein performing the transaction in the degraded mode comprises preparing the goods for delivery to the authorized user; and
   wherein performing the transaction in the non-degraded mode comprises delivering the goods to the authorized user.

* * * * *